(12) United States Patent
Liao et al.

(10) Patent No.: US 8,839,935 B2
(45) Date of Patent: Sep. 23, 2014

(54) TRANSMISSION DEVICE

(75) Inventors: Yan-Sin Liao, Lugong (TW); Chien-Tzu Chen, Lugong (TW); Chien-Tai Huang, Lugong (TW); Bo-Ruei Chen, Lugong (TW); Fu-Yen Huang, Lugong (TW); Shou-Ti Cheng, Lugong (TW)

(73) Assignee: Automotive Research & Testing Center, Lugong, Changhua County (TW)

( * ) Notice: Subject to any disclaimer, the term of this patent is extended or adjusted under 35 U.S.C. 154(b) by 1281 days.

(21) Appl. No.: 12/647,313

(22) Filed: Dec. 24, 2009

(65) Prior Publication Data

US 2011/0094836 A1 Apr. 28, 2011

(51) Int. Cl.
*F16D 63/00* (2006.01)
*B60W 10/10* (2012.01)

(52) U.S. Cl.
USPC ............... 192/219.4; 192/223.2; 188/82.8

(58) Field of Classification Search
USPC ................ 192/219.4, 223.2, 223.3
See application file for complete search history.

(56) References Cited

U.S. PATENT DOCUMENTS 6,938,736 B2 9/2005 Takahashi

*Primary Examiner* — Jacob S Scott
(74) *Attorney, Agent, or Firm* — Allston L. Jones; Peters Verny, LLP

(57) ABSTRACT

A transmission device includes a mounting frame having an abutting member, a driving sleeve sleeved fixedly on a drive shaft extending through the base plate, a transmission wheel sleeved rotatably on the driving sleeve, and a connecting post extending through a radially extending through hole in the transmission wheel and into a spiral first guiding groove in the driving sleeve having opposite first and second ends. A position-limiting member is disposed rotatably on a side surface of the transmission wheel. A ball is disposed in a ball-receiving hole in the position-limiting member and is movable in a curved second guiding groove in the side surface of the transmission wheel having a shallower first end and a deeper second end. When the drive shaft rotates regularly and reversely, the ball is spaced apart from the abutting member.

12 Claims, 14 Drawing Sheets

TRANSMISSION DEVICE

BACKGROUND OF THE INVENTION

1. Field of the Invention

The invention relates to a transmission device, more particularly to a transmission device capable of preventing reverse transmission.

2. Description of the Related Art

FIGS. 1 and 2 illustrate a conventional electric parking brake mechanism 13 disclosed in U.S. Pat. No. 6,938,736. The conventional electric parking brake mechanism 13 is characterized by an electric parking brake for pressing a friction member to a braked member via a force transmission converting mechanism 10 for converting a rotational movement of the motor 11 to a linear movement. The conventional electric parking brake mechanism 13 includes an input shaft 130, an output shaft 122, a non-rotating member 131, a rotating member 132, a first cam member 135, two second cam members 134, a spring 137 and two balls 136.

In such a configuration, the first and second cam members 135, 134 are used, thereby resulting in relatively high cost. Furthermore, when the motor 11 is operated in high-speed rotation, friction between the balls 136 and the non-rotating member 131 occurs due to a centrifugal force acted on each ball 136, thereby reducing efficiency. Moreover, due to friction between the balls 136 and the non-rotating member 131, wear of the balls 136 and the non-rotating member 131 occurs, thereby increasing a clearance between each ball 136 and the non-rotating member 131. Therefore, accurate operation cannot be ensured after a long period of use.

SUMMARY OF THE INVENTION

Therefore, an object of the present invention is to provide a transmission device that can overcome the aforesaid drawbacks of the prior art.

According to the present invention, there is provided a transmission device adapted to be coupled to a drive shaft that is pivotable about a pivot axis. The transmission device comprises:

a mounting frame including an abutting member;

a driving sleeve adapted to be sleeved on the drive shaft such that the driving sleeve co-rotates with the drive shaft, the driving sleeve having an annular outer surface formed with at least one spiral first guiding groove that has opposite first and second ends;

a transmission wheel formed with an axial hole permitting extension of the driving sleeve thereinto such that the transmission wheel is sleeved rotatably on the driving sleeve, and at least one radially extending through hole in spatial communication with the axial hole and corresponding to the first guiding groove in the driving sleeve, the transmission wheel having a side surface formed with a curved second guiding groove that has opposite first and second ends, the second guiding groove having a depth increasing gradually toward the second end thereof;

a connecting unit including at least one connecting post extending through the through hole in the transmission wheel and into the first guiding groove in the driving sleeve, and movable in the first guiding groove in the driving sleeve such that the transmission wheel is moved toward the abutting member of the mounting frame in a longitudinal direction parallel to the pivot axis by a first distance when the connecting post is guided by said first guiding groove in the driving sleeve to move from the second end of the first guiding groove to the first end of the first guiding groove in response to rotation of the driving sleeve driven by the drive shaft;

a position-limiting member disposed movably on the side surface of the transmission wheel, formed with at least one ball-receiving hole corresponding to the second guiding groove in the side surface of the transmission wheel, and rotatable relative to the transmission wheel about the pivot axis between a first position, where the ball-receiving hole is disposed adjacent to the second end of the second guiding groove in the side surface of the transmission wheel, and a second position, where the ball-receiving hole is disposed adjacent to the first end of the second guiding groove in the side surface of the transmission wheel; and at least one ball disposed in the ball-receiving hole in the position-limiting member, and movable in the second guiding groove in the side surface of the transmission wheel such that the ball moves toward the abutting member of the mounting frame in the longitudinal direction by a second distance when the ball moves from the second end of the second guiding groove in the side surface of the transmission wheel to the first end of the second guiding groove in the side surface of the transmission wheel in response to rotation of the position-limiting member relative to the transmission wheel from the first position to the second position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
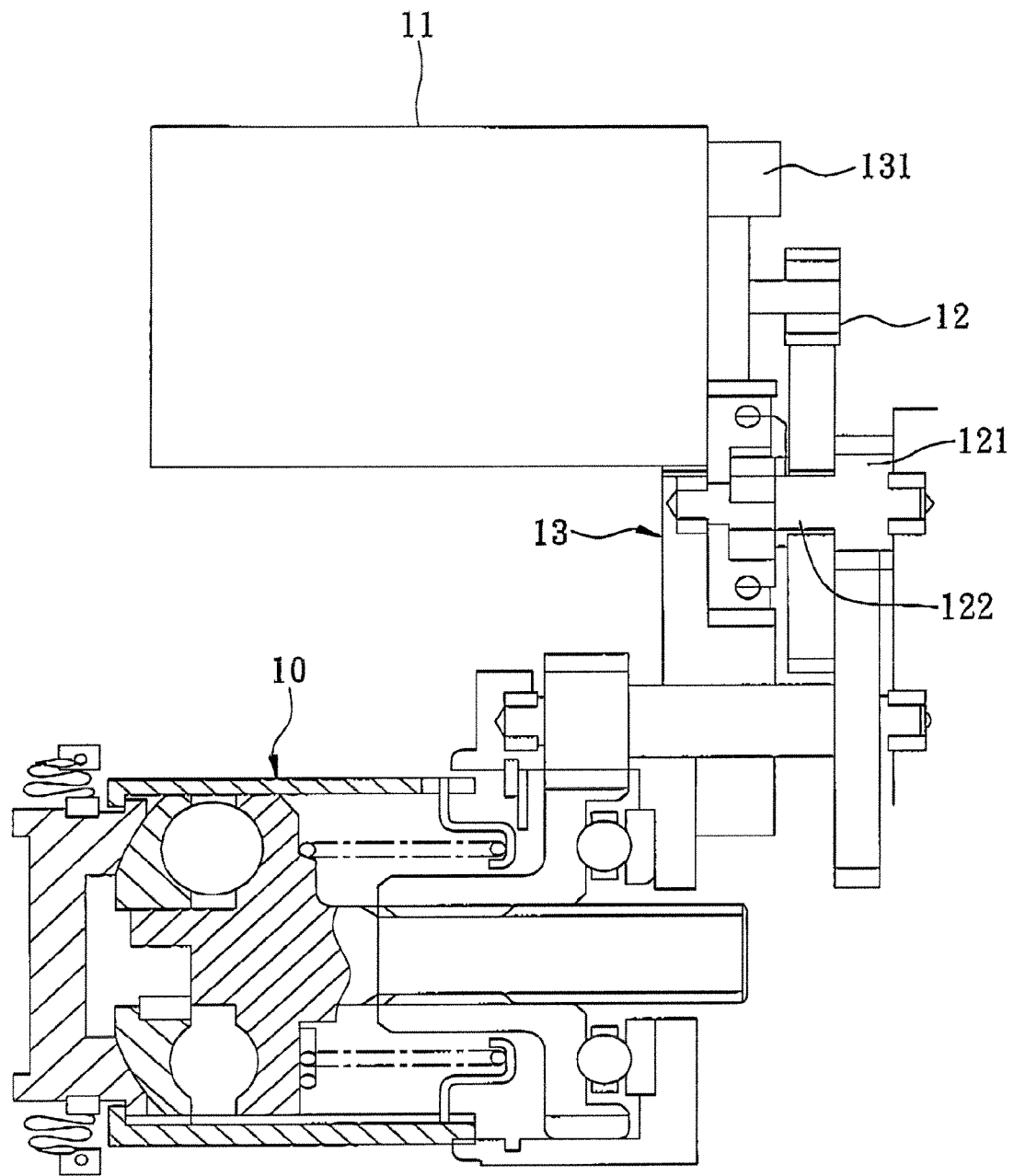
FIG. 1 is a partly schematic sectional view of a conventional electric parking brake mechanism.
Figure 2:
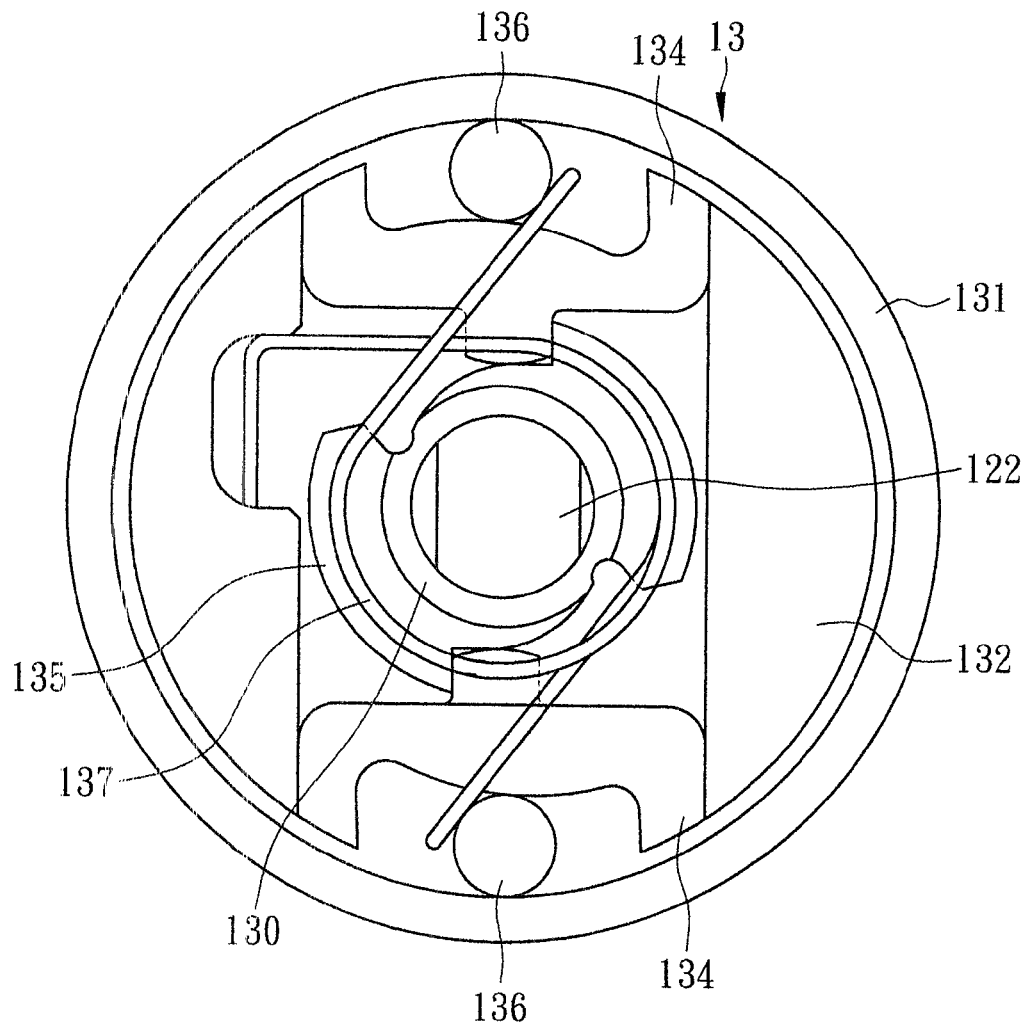
FIG. 2 is a schematic view illustrating constitution of the conventional electric parking brake mechanism.

Before the present invention is described in greater detail, it should be noted that like elements are denoted by the same reference numerals throughout the disclosure.

Figure 3:
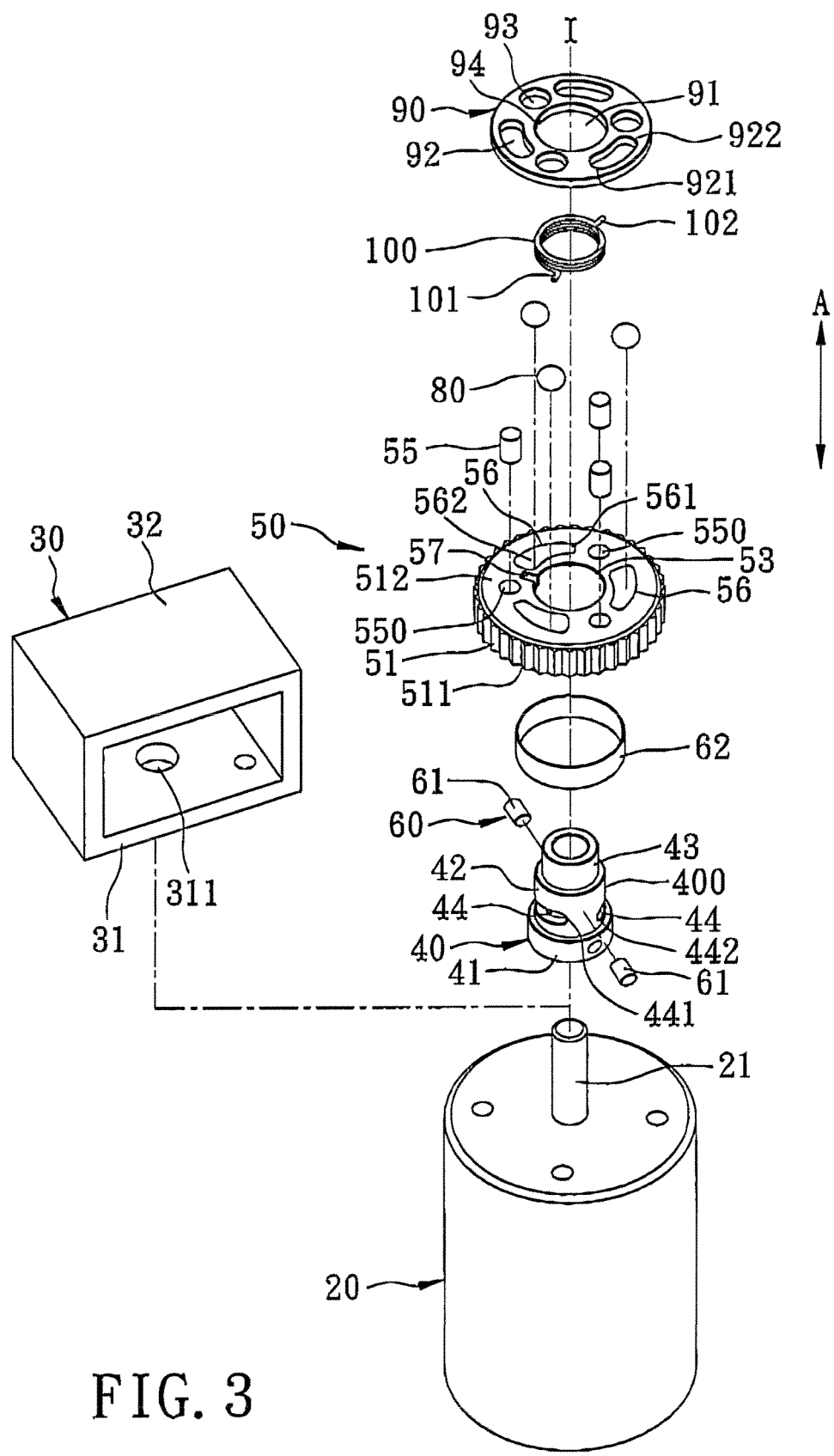
FIG. 3 is an exploded perspective view showing the first preferred embodiment of a transmission device according to the present invention.
Figure 4:
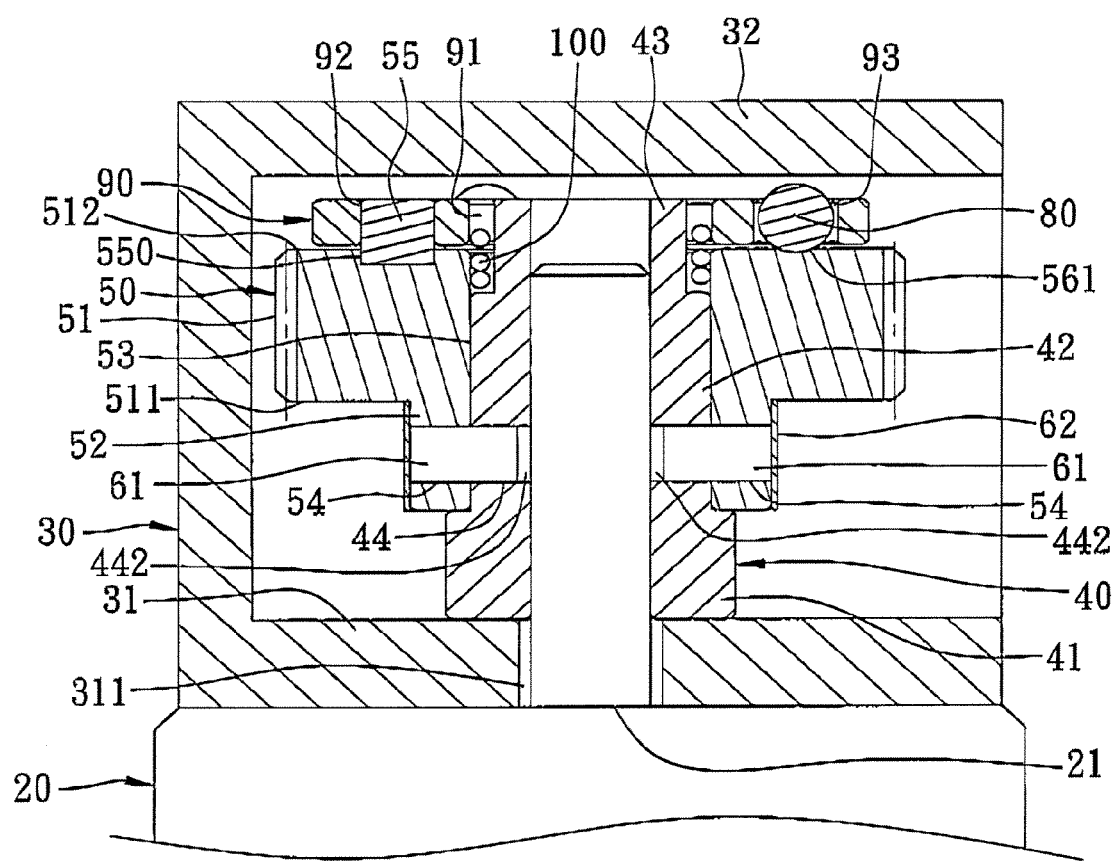
FIG. 4 is an assembled schematic sectional view showing the first preferred embodiment when a drive shaft rotates in a counterclockwise direction.

Referring to FIGS. 3 and 4, the first preferred embodiment of a transmission device according to the present invention is shown to include a mounting frame 30, a driving sleeve 40, a transmission wheel 50, a connecting unit 60, a position-limiting member 90, three balls 80, and a biasing member. In this embodiment, the drive shaft 21 is an output shaft of a motor 20 that is operable to output rotation power for driving a brake mechanism (not shown) via the transmission device and a gear system (not shown), and is pivotable about a pivot axis (I).

The mounting frame 30 includes a base plate 31 formed with a through hole 311 adapted to permit extension of the drive shaft 21 therethrough, and an abutting member 32 opposite to the base plate 31 in a longitudinal direction (A) parallel to the pivot axis (I). In this embodiment, the abutting member 32 is a plate body parallel to the base plate 31.

The driving sleeve 40 is adapted to be sleeved on the drive shaft 21 such that the driving sleeve 40 co-rotates with the drive shaft 21. In this embodiment, the driving sleeve 90 includes a first segment 41 disposed adjacent to the base plate 31 of the mounting frame 30, a second segment 42 connected to the first segment 41 and having an outer diameter less than that of the first segment 41, and a third segment 43 opposite to the first segment 41, connected to the second segment 42 and having an outer diameter less than that of the second segment 42. The second segment 42 of the driving sleeve 40 is formed with two spiral first guiding grooves 44 opposite to each other. Each first guiding groove 44 has a first end 441, and a second end 442 opposite to the first end 441 and disposed adjacent to the base plate 31 of the mounting frame 30.

Figure 7:
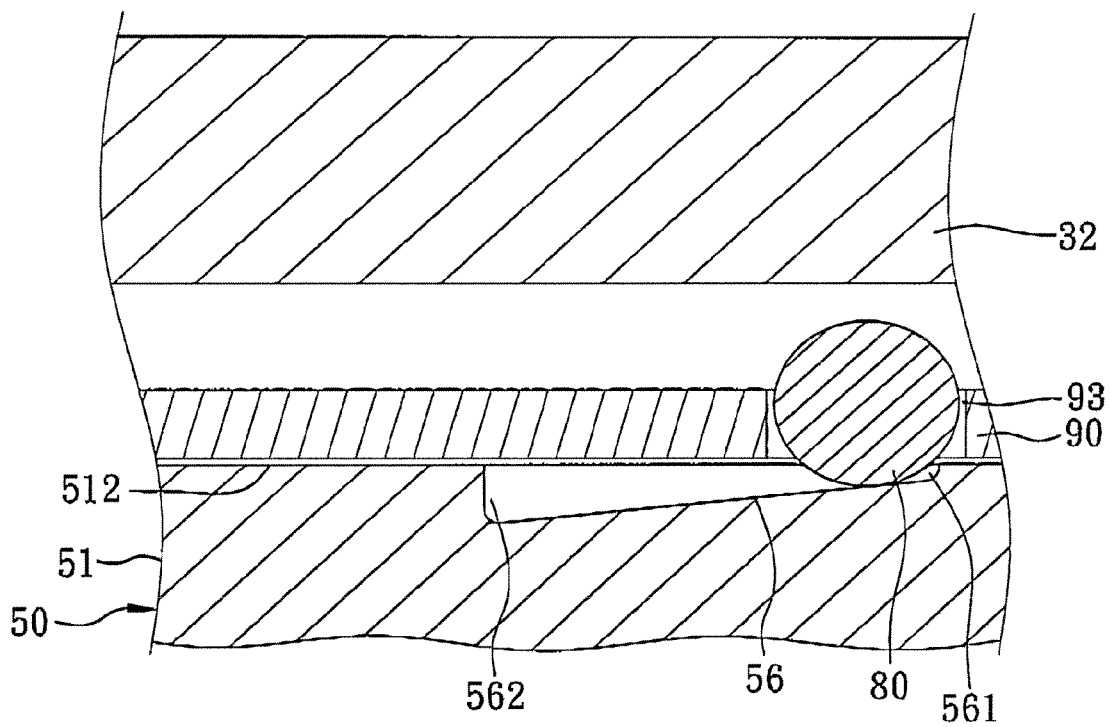
FIG. 7 is a fragmentary, partly schematic sectional view illustrating a relationship among one ball, an abutting member and a corresponding second guiding groove of the first preferred embodiment when the drive shaft rotates in the counterclockwise direction.

The transmission wheel 50 is formed with an axial hole 53 permitting extension of the driving sleeve 40 thereinto such that the transmission wheel 50 is sleeved rotatably on the second segment 42 of the driving sleeve 40. In this embodiment, the transmission wheel 50 has a connecting end portion 52, and a transmission end portion 51 opposite to the connecting end portion 52 in the longitudinal direction (A). The connecting end portion 52 is formed with two radially extending through holes 54 opposite to each other, in spatial communication with the axial hole 53 and corresponding respectively to the first guiding grooves 49 in the driving sleeve 90. The transmission end portion 51 is in the form of a gear, and has a side surface 512 distal from the base plate 31 of the mounting frame 30, and formed with three curved second guiding grooves 56 spaced apart from each other, and three mounting holes 550 each disposed between a respective adjacent pair of the second guiding grooves 56. Each second guiding groove 56 has opposite first and second ends 561, 562, and has a depth increasing gradually toward the second end 562, as shown in FIG. 7. The transmission wheel 50 further has three guiding rods 55 mounted respectively in the mounting holes 550 in the side surface 512 and extending outwardly of the side surface 512 in the longitudinal direction (A). In this embodiment, the side surface 512 of the transmission wheel 50 is further formed with a radially extending first positioning groove 57 in spatial communication with the axial hole 53.

Figure 5:
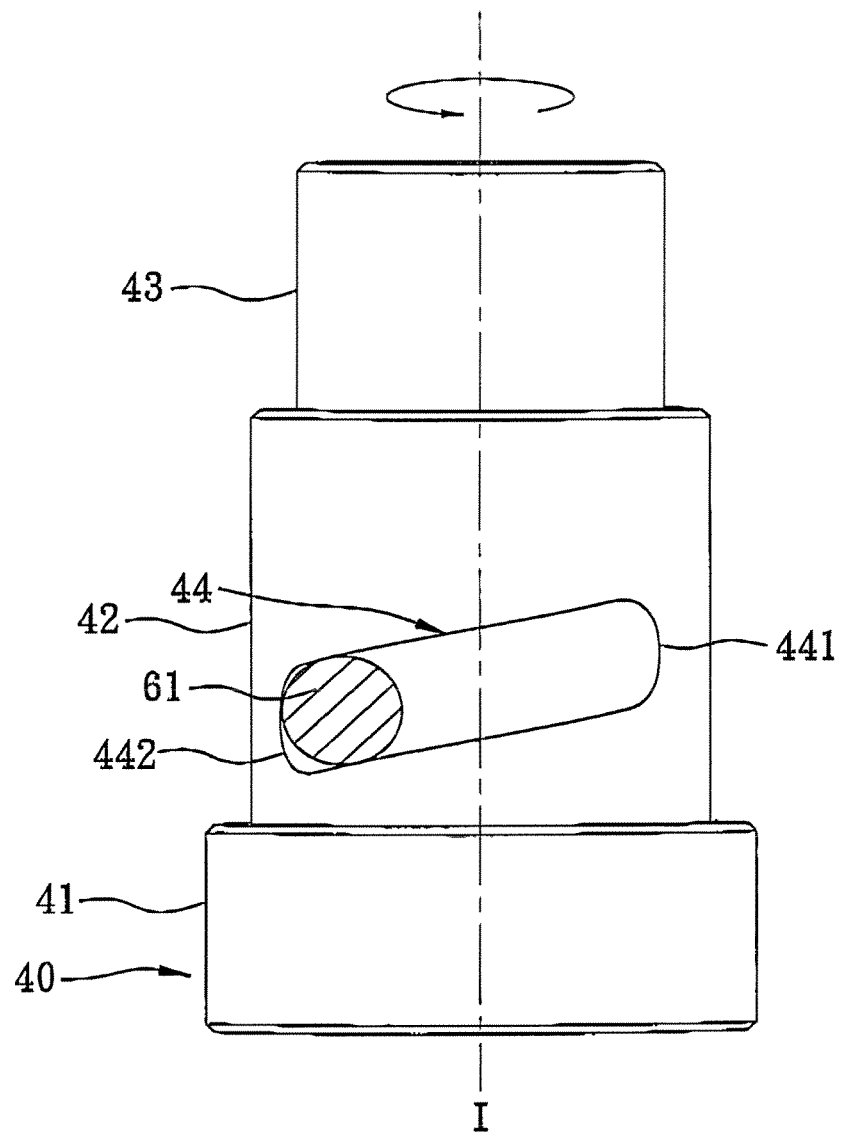
FIG. 5 is a partly schematic sectional view illustrating a relationship between a connecting post and a driving sleeve of the first preferred embodiment when the drive shaft rotates in the counterclockwise direction.
Figure 9:
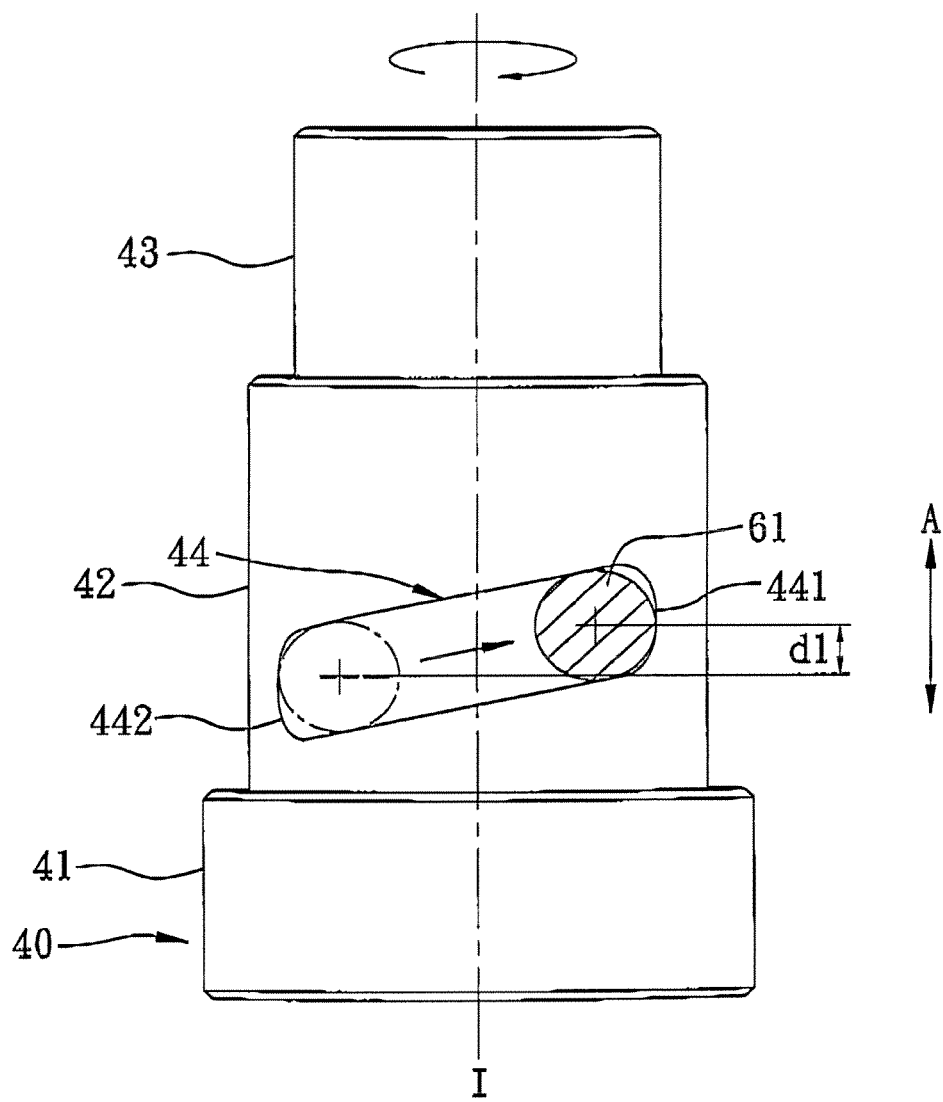
FIG. 9 is a partly schematic sectional view illustrating a relationship between the connecting post and the driving sleeve of the first preferred embodiment when the drive shaft rotates in the clockwise direction.

In this embodiment, the connecting unit 60 includes two connecting posts 61, and a positioning ring 62. Each connecting post 61 extends through a corresponding through hole 54 in the connecting end portion 52 of the transmission wheel 50 and into a corresponding first guiding groove 44 in the driving sleeve 40. The positioning ring 62 is sleeved on the connecting end portion 52 of the transmission wheel 50 for retaining each connecting post 61 in the corresponding through hole 54 in the connecting end portion 52 of the transmission wheel 50 and the corresponding first guiding groove 44 in the driving sleeve 40. Each connecting post 61 is movable in the corresponding first guiding groove 44 in the driving sleeve 40 (see FIG. 5). Therefore, when each connecting post 61 is guided by the corresponding first guiding groove 44 in the driving sleeve 40 from the second end 442 thereof to the first end 441 thereof in response to rotation of the driving sleeve 40 driven by the drive shaft 21, the transmission wheel 50 is moved toward the abutting member 32 of the mounting frame 30 in the longitudinal direction (A) by a first distance (d1), such as 1.5 mm, as shown in FIG. 9.

Figure 6:
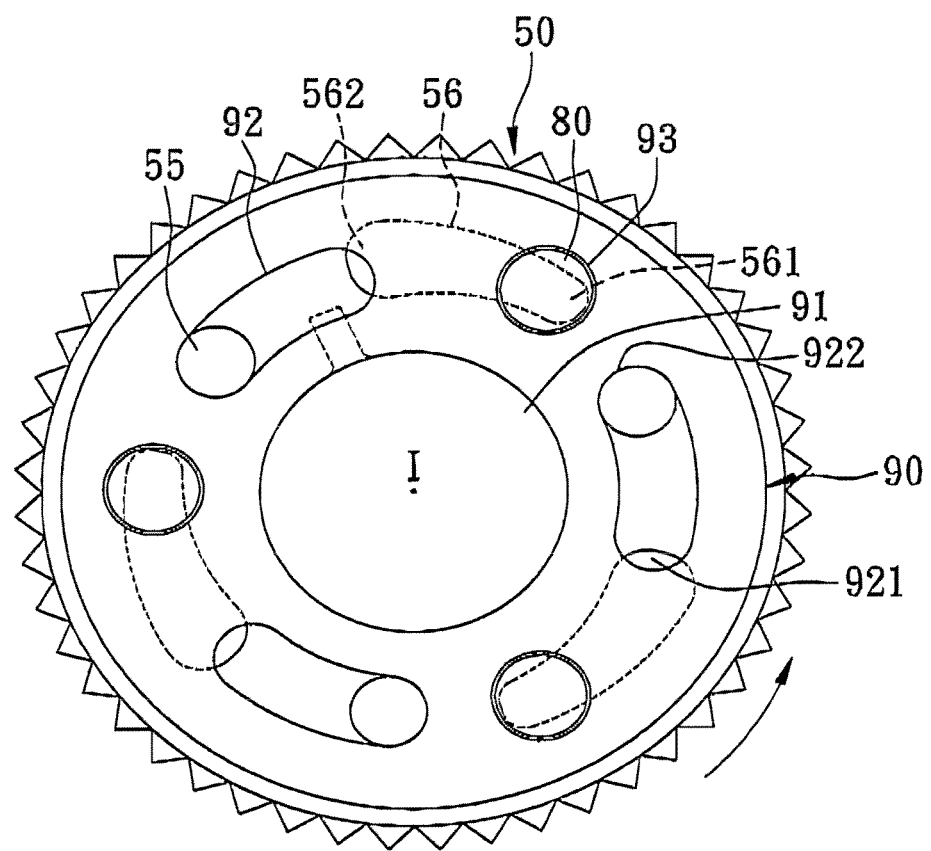
FIG. 6 is a schematic top view illustrating a relationship among balls, a transmission wheel and a position-limiting member of the first preferred embodiment when the drive shaft rotates in the counterclockwise direction.
Figure 8:
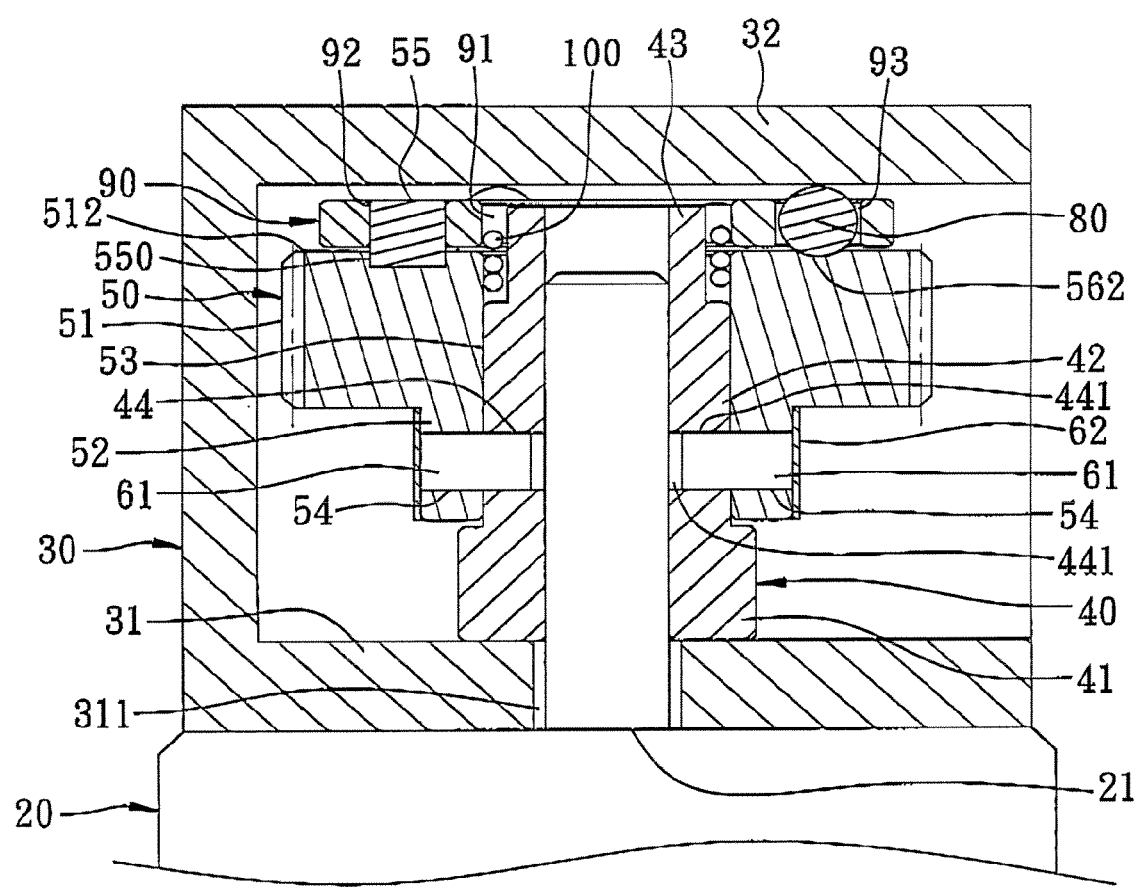
FIG. 8 is a schematic sectional view showing the first preferred embodiment when the drive shaft rotates in a clockwise direction.
Figure 10:
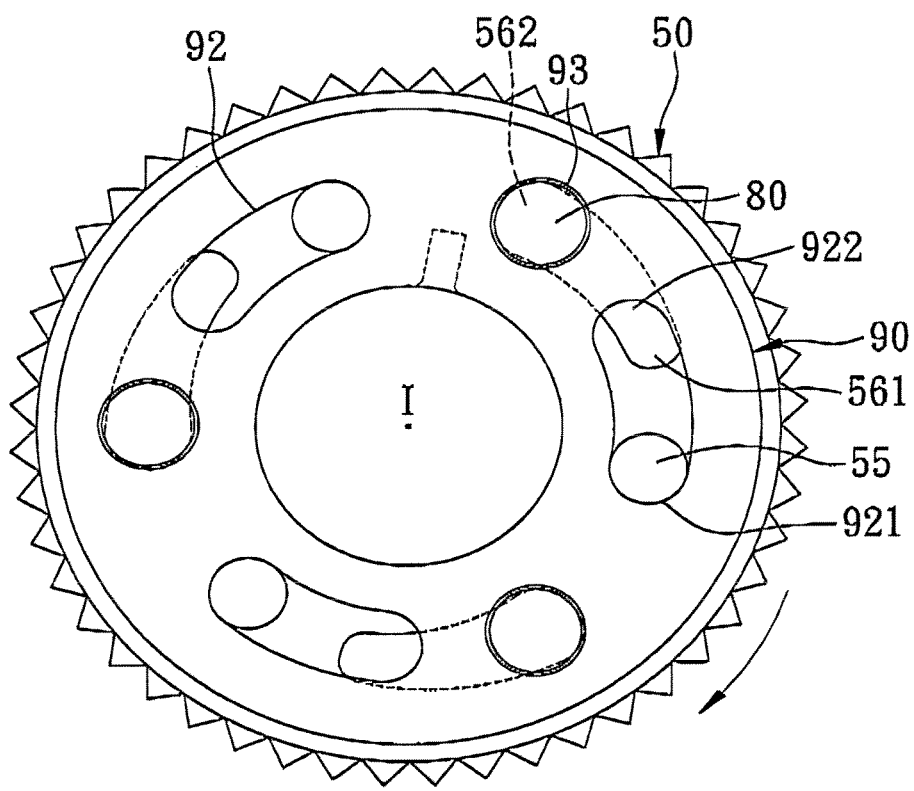
FIG. 10 is a schematic top view illustrating a relationship among the balls, the transmission wheel and the position-limiting member of the first preferred embodiment when the drive shaft rotates in the clockwise direction.

The position-limiting member 90 is in the form of a ring body in this embodiment, and is formed with a center hole 91 having a diameter larger than the outer diameter of the third segment 43 of the driving sleeve 40. The position-limiting member 90 is disposed movably on the side surface 512 of the transmission wheel 50, and is sleeved spacedly on the third segment 43 of the driving sleeve 40. The position-limiting member 90 is formed with three ball-receiving holes 93 corresponding respectively to the second guiding grooves 56 in the transmission wheel 50, and three curved rod-guiding holes 92 corresponding respectively to the guiding rods 55 of the transmission wheel 50. Each rod-guiding hole 92 permits extension of a corresponding guiding rod 55 of the transmission wheel 50 therethrough such that each guiding rod 55 of the transmission wheel 50 is movable in the corresponding rod-guiding hole 92. As a result, the position-limiting member 90 is rotatable relative to the transmission wheel 50 about the pivot axis (I) between a first position, where each ball-receiving hole 93 is disposed adjacent to the second end 562 of a corresponding second guiding groove 56 in the transmission wheel 50, as shown in FIGS. 8 and 10, and a second position, where each ball-receiving hole is disposed adjacent to the first end 561 of a corresponding second guiding groove 56 in the transmission wheel 50, as shown in FIGS. 4 and 6. When the position-limiting member 90 is at the first position, each guiding rod 55 of the transmission wheel 50 is in the first end 921 of the corresponding rod-guiding hole 92, as shown in FIG. 10. When the position-limiting member 90 is at the second position, each guiding rod 55 of the transmission wheel 50 is in the second end 922 of the corresponding rod-guiding hole 92, as shown in FIG. 6. In this embodiment, the position-limiting member 90 is further formed with a second positioning hole 94 in spatial communication with the center hole 91 (see FIG. 3).

Figure 11:
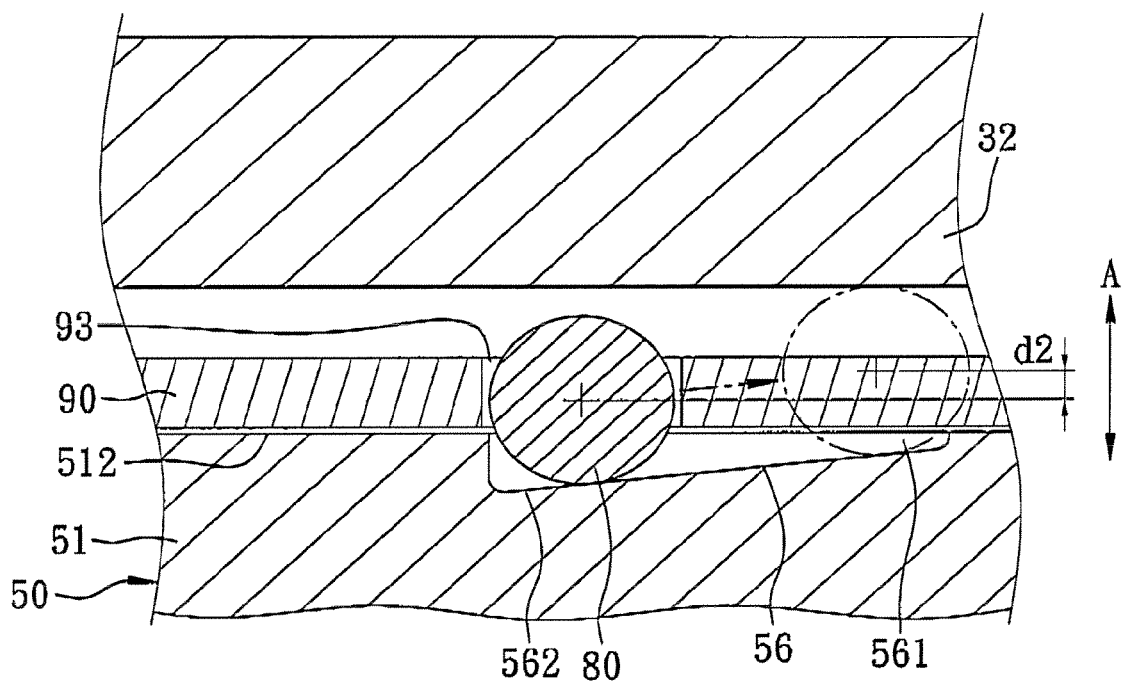
FIG. 11 is a fragmentary, partly schematic sectional view illustrating a relationship among one ball, the abutting member and a corresponding second guiding groove of the first preferred embodiment when the drive shaft rotates in the clockwise direction.
Figure 12:
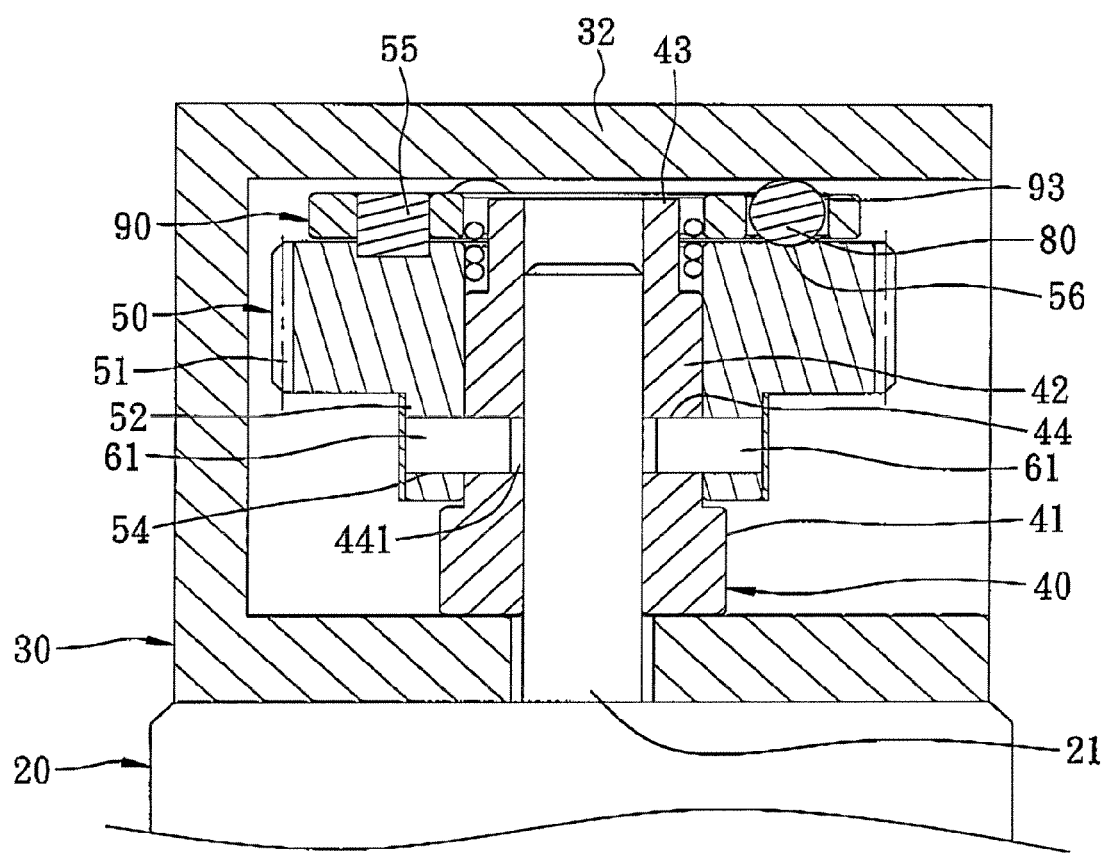
FIG. 12 is a schematic sectional view showing the first preferred embodiment when operated in a locking state.

Each ball 80 is disposed in a corresponding ball-receiving hole 93 in the position-limiting member 90, and is movable in a corresponding second guiding groove 56 in the transmission wheel 50 such that each ball 80 moves toward the abutting member 32 of the mounting frame 30 in the longitudinal direction (A) by a second distance (d2), such as 1.5 mm, when each ball 80 moves from the second end 562 of the corresponding second guiding groove 56 in the transmission wheel 50 to the first end 561 of the corresponding second guiding groove 56 in the transmission wheel 50 in response to rotation of the position-limiting member 90 relative to the transmission wheel 50 from the first position to the second position, as shown in FIG. 11. In this embodiment, the ball-receiving holes 93 in the position-limiting member 90 have a diameter greater than that of the balls 80.

It is noted that, each connecting post 61 is in the second end 442 of the corresponding first guiding groove 44 in the driving sleeve 40 and when the position-limiting member 90 is at the first position, each ball 80 is spaced apart from the abutting member 32 of the mounting frame 30, thereby defining a third distance (d3), such as 2 mm, in the longitudinal direction (A) therebetween. The third distance (d3) is greater than each of the first and second distances (d1, d2) and is less than a sum of the first and second distances (d1, d2).

Figure 13:
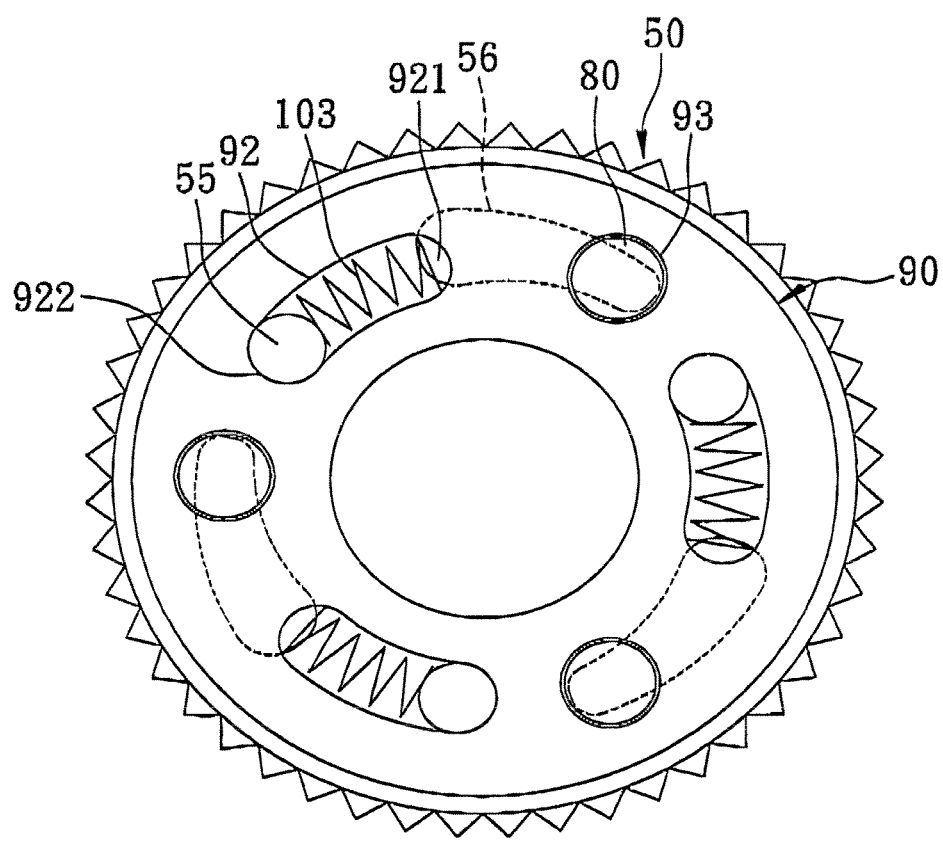
FIG. 13 is a schematic top view illustrating another embodiment of the biasing member.

The biasing member biases the position-limiting member 90 to move relative to the transmission wheel 50 toward the second position. In this embodiment, the biasing member includes a torsion spring 100 sleeved on the third segment 43 of the driving sleeve 40, and has opposite first and second end portions 101, 102 engaging respectively the first positioning groove 57 in the side surface 512 of the transmission wheel 50 and the second positioning groove 94 in the position-limiting member 90. FIG. 13 illustrates another embodiment of the biasing member, wherein the biasing member includes three compression springs 103, each of which is received in a corresponding rod-guiding hole 92 in the position-limiting member 90, and has one end abutting against the guiding rod 55 in the corresponding rod-guiding hole 92, and the other end disposed in the first end 921 of the corresponding rod-guiding hole 92.

In actual operation, when the drive shaft 21 rotates so as to drive rotation of an assembly of the driving sleeve 40, the transmission wheel 50, the position-limiting member 90 and the balls 80 about the pivot axis (I) in a first direction, such as a clockwise direction indicated by an arrow of FIG. 10, each connecting post 61 engages the first end 441 of the corresponding first guiding groove 44 in the driving sleeve 40, each guiding rod 55 of the transmission wheel engages the first end 921 of the corresponding rod-guiding hole 92 in the position-limiting member 90, and each ball 80 is retained in the second end 562 of the corresponding second guiding groove 56 in the transmission wheel 50, as shown in FIGS. 8 and 10. In this case, though the transmission wheel 50 is moved relative to the driving sleeve 40 toward the abutting member 32 by the first distance (d1), each ball 80 is spaced apart from the abutting member 52 by a clearance less than the second distance (d2). On the other hand, when the drive shaft 21 rotates so as to drive rotation of the assembly of the driving sleeve 40, the transmission wheel 50, the position-limiting member 90 and the balls 80 about the pivot axis (I) in a second direction that is reverse to the first direction, such as a counterclockwise direction indicated by an arrow of FIG. 6, each connecting post 61 engages the second end 442 of the corresponding first guiding groove 44 in the driving sleeve 40, each guiding rod 55 of the transmission wheel 50 engages the second end 922 of the corresponding rod-guiding hole 92 in the position-limiting member 90, and each ball 80 is retained in the first end 561 of the corresponding second guiding groove 56 in the transmission wheel 50, as shown in FIGS. 4 and 6. In this case, though each ball 80 moves toward the abutting member 32 by the second distance (d2), each ball 80 is spaced apart from the abutting member 32 by a clearance less than the first distance (d1).

In use, when the drive shaft 21 rotates in the clockwise direction, the brake mechanism can be brought into a brake state via the transmission device and the gear system. When the drive shaft 21 rotates in the counterclockwise direction, the brake mechanism can be brought into a releasing-brake state via the transmission device. It is noted that, during the brake state of the brake mechanism, the drive shaft 21 does not rotate once the motor 20 is brought into a stationary state, for example, the motor 20 is shut down. In this case, the driving sleeve 40 is stationary. At the same time, the transmission wheel 50 is driven by a reverse power from the gear system to rotate in the counterclockwise direction. As a result, each ball 80 moves from the second end 562 of the corresponding second guiding groove 56 in the transmission wheel 50 to the first end 561 of the same, thereby moving toward the abutting member 32, as shown in FIG. 11. Since the clearance between each ball 80 and the abutting member 32 is less the second distance (d2), the balls 80 are clamped between the abutting member 32 and the transmission wheel 50, thereby terminating rotation of the transmission wheel 50. In this case, the transmission device is brought into a locking state. As such, the brake mechanism can be held in the brake state. Thereafter, when the drive shaft 21 is operable to drive clockwise rotation of the driving sleeve 40, the balls 80 are released from the abutting member 32.

Figure 14:
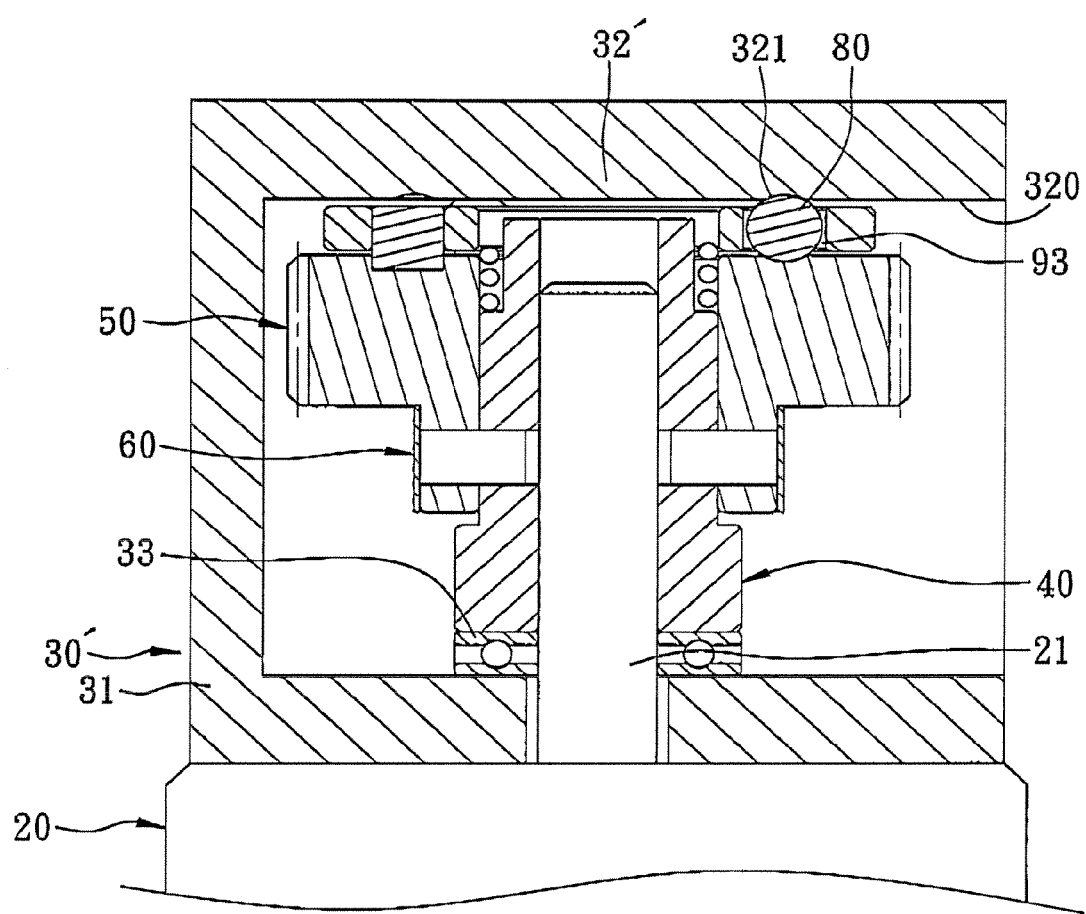
FIG. 14 is a schematic sectional view showing the second preferred embodiment of a transmission device according to the present invention when operated in a locking state.

FIG. 14 illustrates the second preferred embodiment of a transmission device according to this invention, which is a modification of the first preferred embodiment. In this embodiment, the abutting member 32, i.e., the plate body of the mounting frame 30', has a surface 320 facing the position-limiting member 90 and formed with an annular groove 321 that is defined by a concave wall. Furthermore, the transmission device further includes a bearing 33 adapted to be sleeved on the drive shaft 21 and disposed between the base plate 31 of the mounting frame 30 and the driving sleeve 40. It is noted that when the transmission device is in the locking state, the balls 80 are easily clamped due to relatively large frictions between the concave wall of the abutting member 32' and the balls 80.

In sum, due to the presence of the first guiding grooves 44, the second guiding grooves 56 and the position-limiting member 90, the transmission device of the present invention can be accurately operated without the wear problem encountered in the aforesaid prior art. Furthermore, since expensive cam components in the aforesaid prior art are not required, the transmission device of the present invention can be manufactured at relatively low costs as compared to the aforesaid prior art.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A transmission device adapted to be coupled to a drive shaft that is pivotable about a pivot axis, said transmission device comprising:
   a mounting frame including an abutting member;
   a driving sleeve adapted to be sleeved on the drive shaft such that said driving sleeve co-rotates with the drive shaft, said driving sleeve having an annular outer surface formed with at least one spiral first guiding groove that has opposite first and second ends;
   a transmission wheel formed with an axial hole permitting extension of said driving sleeve thereinto such that said transmission wheel is sleeved rotatably on said driving sleeve, and at least one radially extending through hole in spatial communication with said axial hole and corresponding to said first guiding groove in said driving sleeve, said transmission wheel having a side surface formed with a curved second guiding groove that has opposite first and second ends, said second guiding groove having a depth increasing gradually toward said second end thereof;

a connecting unit including at least one connecting post extending through said through hole in said transmission wheel and into said first guiding groove in said driving sleeve, and movable in said first guiding groove in said driving sleeve such that said transmission wheel is moved toward said abutting member of said mounting frame in a longitudinal direction parallel to the pivot axis by a first distance when said connecting post is guided by said first guiding groove in said driving sleeve from said second end of said first guiding groove to said first end of said first guiding groove in response to rotation of the driving sleeve driven by the drive shaft;

a position-limiting member disposed movably on said side surface of said transmission wheel, formed with at least one ball-receiving hole corresponding to said second guiding groove in said side surface of said transmission wheel, and rotatable relative to said transmission wheel about the pivot axis between a first position, where said ball-receiving hole is disposed adjacent to said second end of said second guiding groove in said side surface of said transmission wheel, and a second position, where said ball-receiving hole is disposed adjacent to said first end of said second guiding groove in said side surface of said transmission wheel; and at least one ball disposed in said ball-receiving hole in said position-limiting member, and movable in said second guiding groove in said side surface of said transmission wheel such that said ball moves toward said abutting member of said mounting frame in the longitudinal direction by a second distance when said ball moves from said second end of said second guiding groove in said side surface of said transmission wheel to said first end of said second guiding groove in said side surface of said transmission wheel in response to rotation of said position-limiting member relative to said transmission wheel from the first position to the second position.

2. The transmission device as claimed in claim 1, wherein:
said position-limiting member is further formed with at least one curved rod-guiding hole having opposite first and second ends; and
said transmission wheel further has at least one guiding rod extending from said side surface in the longitudinal direction through said rod-guiding hole in said position-limiting member such that said guiding rod is movable in said rod-guiding hole in said position-limiting member; and
when said position-limiting member is at the first position, said guiding rod of said transmission wheel is in said first end of said rod-guiding hole, and when said position-limiting member is at the second position, said guiding rod of said transmission wheel is in said second end of said rod-guiding hole.

3. The transmission device as claimed in claim 2, wherein:
when the drive shaft rotates so as to drive rotation of an assembly of said driving sleeve, said transmission wheel, said position-limiting member and said ball about the pivot axis in a first direction, said connecting post engages the first end of said first guiding groove in said driving sleeve, said guiding rod of said transmission wheel engages said first end of said rod-guiding hole in said position-limiting member, and said ball is retained in said second end of said second guiding groove in said side surface of said transmission wheel; and when the drive shaft rotates so as to drive rotation of the assembly of said driving sleeve, said transmission wheel, said position-limiting member and said ball about the pivot axis in a second direction that is reverse to the first direction, said connecting post engages the second end of said first guiding groove in said driving sleeve, said guiding rod of said transmission wheel engages said second end of said rod-guiding hole in said position-limiting member, and said ball is retained in said first end of said second guiding groove in said side surface of said transmission wheel.

4. The transmission device as claimed in claim 2, wherein:
said driving sleeve has a first segment disposed distal from said abutting member of said mounting frame, and a second segment connected to said first segment, having an outer diameter less than that of said first segment and formed with said first guiding groove.

5. The transmission device as claimed in claim 4, wherein:
said transmission wheel is sleeved on said second segment of said driving sleeve, and has a connecting end portion formed with said through hole, and a transmission end portion opposite to said connecting end portion in the longitudinal direction and having said side surface; and
said connecting unit further includes a positioning ring sleeved on said connecting end portion of said transmission wheel for retaining said connecting post in said through hole in said transmission wheel and said first guiding groove in said driving sleeve.

6. The transmission device as claimed in claim 4, further comprising a biasing member for biasing said position-limiting member to move relative to said transmission wheel toward the second position.

7. The transmission device as claimed in claim 6, wherein:
said side surface of said transmission wheel is formed with a radially extending first positioning groove in spatial communication with said axial hole;
said position-limiting member is formed with a second positioning groove;
said driving sleeve further has a third segment opposite to said first segment, connected to said second segment and having an outer diameter less than that of said second segment;
said biasing member includes a torsion spring sleeved on said third segment of said driving sleeve, and has opposite first and second end portions engaging respectively said first positioning groove in said side surface of said transmission wheel and said second positioning groove in said position-limiting member.

8. The transmission device as claimed in claim 7, wherein said position-limiting member is in the form of a ring body, and is formed with a center hole having a diameter larger than the outer diameter of said third segment of said driving sleeve such that said position-limiting member is disposed spacedly around said third segment of said driving sleeve, said second positioning groove being in spatial communication with said center hole.

9. The transmission device as claimed in claim 6, where said biasing member includes at least one compression spring received in said rod-guiding hole in said position-limiting member, and having one end abutting against said guiding rod of said transmission wheel, and the other end disposed in said first end of said rod-guiding hole in said position-limiting member.

10. The transmission device as claimed in claim 1, wherein said mounting frame has a plate body disposed above said position-limiting member and serving as said abutting member.

11. The transmission device as claimed in claim 10, wherein said plate body of said mounting frame has a surface facing said position-limiting member and formed with an annular groove that is defined by a concave wall.

12. The transmission device as claimed in claim 1, wherein said mounting frame further includes a base plate opposite to said abutting member in the longitudinal direction, and adapted to permit extension of the drive shaft therethrough;
   said transmission device further comprising a bearing adapted to be sleeved on said drive shaft and disposed between said base plate of said mounting frame and said driving sleeve.

* * * * *